United States Patent
Belzile

(10) Patent No.: US 6,931,770 B2
(45) Date of Patent: Aug. 23, 2005

(54) FRONT EQUIPMENT MOUNT FOR A WHEELED VEHICLE

(76) Inventor: Luc Belzile, 61 Pointe du Jour Lane, Petit-Shippagan, New Brunswick (CA), E8T 2Z4

( * ) Notice: Subject to any disclaimer, the term of this patent is extended or adjusted under 35 U.S.C. 154(b) by 336 days.

(21) Appl. No.: 10/368,791

(22) Filed: Feb. 19, 2003

(65) Prior Publication Data
US 2004/0187358 A1 Sep. 30, 2004

(51) Int. Cl.[7] ............................................... E01H 5/04
(52) U.S. Cl. ........................................................ 37/231
(58) Field of Search ........................ 37/231, 232, 233, 37/235, 236, 753, 381, 266–283, 407–410, 903; 172/272, 810–815, 777–779

(56) References Cited

U.S. PATENT DOCUMENTS

| | | |
|---|---|---|
| 1,383,470 A | 7/1921 | Lind |
| 2,091,343 A | 8/1937 | Soule et al. |
| 2,665,016 A | 1/1954 | Etchart |
| 2,867,921 A * | 1/1959 | Brown ........................ 37/231 |
| 3,987,562 A | 10/1976 | Deen et al. |
| 4,470,211 A | 9/1984 | Rossmann |
| 4,615,130 A | 10/1986 | Racicot |
| 4,790,085 A | 12/1988 | Rossman |
| 4,813,164 A | 3/1989 | Morrell |
| 5,088,215 A * | 2/1992 | Ciula .......................... 37/197 |
| 5,171,124 A | 12/1992 | Foster |
| 5,615,745 A * | 4/1997 | Cross ........................ 172/811 |
| 5,674,046 A | 10/1997 | Meyer |
| 6,116,846 A | 9/2000 | Bulkley |
| 6,119,377 A | 9/2000 | Rubio |
| 6,502,334 B1 * | 1/2003 | Davies ........................ 37/231 |
| 6,843,002 B1 * | 1/2005 | Moffitt ........................ 37/231 |

FOREIGN PATENT DOCUMENTS

| | | |
|---|---|---|
| CA | 256206 | 12/1925 |
| CA | 326141 | 9/1932 |
| CA | 379614 | 2/1939 |
| CA | 535370 | 1/1957 |
| CA | 559139 | 6/1958 |
| CA | 614785 | 2/1961 |
| CA | 1182637 | 2/1985 |
| CA | 1213249 | 10/1986 |
| CA | 2197054 | 8/1998 |
| CA | 2029626 | 6/2000 |
| CA | 2357675 | 3/2003 |
| DE | 1282046 | 11/1968 |
| EP | 247583 A1 | 12/1987 |
| GB | 287323 | 3/1928 |
| NR | 88588 | 1/1957 |
| SU | 661063 | 5/1979 |

* cited by examiner

Primary Examiner—Robert E Pezzuto
(74) Attorney, Agent, or Firm—Shughart Thomson & Kilroy P.C.

(57) ABSTRACT

A front equipment mount for attaching a piece of equipment to a front end of a wheeled vehicle having an independent front suspension includes a longitudinal frame and a transverse frame member connected to the longitudinal frame. The longitudinal frame has a forward and end which is positionable proximate the front end of the vehicle and a rearward end which is attachable to the vehicle rearward of the front suspension. The transverse frame member has opposed left and right ends connectable to respective left and right suspension members of the vehicle. The piece of equipment is attachable to the forward end of the longitudinal frame such that the weight of the piece of equipment is supported by the left and right suspension members as unsprung weight.

20 Claims, 8 Drawing Sheets

FRONT EQUIPMENT MOUNT FOR A WHEELED VEHICLE

BACKGROUND OF THE INVENTION

1. Field of the Invention

This invention relates to a mount for attaching equipment such as a snowplow, bucket loader or fork lift to the front of a wheeled vehicle, and in particular to such a mount which can support the equipment as unsprung weight on a vehicle having independent front suspension.

2. Description of the Related Art

It is well known to attach equipment such as snowplow, bucket loader or fork lift to the front of a wheeled vehicle such as a tractor, truck, all-terrain vehicle (ATV) or other vehicle. Mounting such equipment on a tractor is a relatively straight forward procedure because tractors do not typically have any suspension system; i.e. the axles of a tractor are rigidly affixed to the chassis. The equipment can, therefore, be mounted in any convenient location on the vehicle with little concern as to the effect of the weight of the equipment on the handling of the vehicle.

When mounting front-mounted equipment on a truck, ATV, or other vehicle having a suspension, the weight of the equipment becomes a concern. Typically, the equipment is bolted to the frame of the vehicle and the weight of the equipment and any load supported thereon becomes sprung weight, meaning that the weight must be supported by the springs in the vehicle's suspension, and too much sprung weight on the front of a vehicle can cause the front suspension to sag, bottom out, or even collapse.

This problem as been previously addressed in vehicles having solid beam-type front axles by supporting the weight of the equipment on the front axle. For example, U.S. Pat. No. 2,091,343 issued to G. C. Soule et al. in 1937 discloses a snowplow mount for a truck with a beam axle. The weight of the snowplow is carried by brackets which hook over and attach to the front axle. The plow is stabilized by a framework which extends rearwardly under the truck and bolts to the truck frame forward of the rear wheels. The result is that the weight of the snowplow is not carried by the truck's suspension, but instead becomes unsprung weight supported only by the axle and front wheels. The only force transmitted to the frame is an upward force near the rear of the vehicle which, due to the length of the framework, is only a fraction of the weight of the plow. Similar inventions are disclosed by Canadian Patents 326,141 and 535,370.

While equipment mounts as described above work acceptably well in older vehicles or large trucks having solid front axles, they are not applicable to newer light trucks, sport utility vehicles or ATVs having independent front suspension since these vehicles have no axle to which to attach the equipment mount. What is needed is an improved front equipment mount capable of mounting a snowplow, bucket loader, forklift or similar piece of equipment to a wheeled vehicle with independent front suspension wherein the mount is designed to support the equipment as unsprung weight.

SUMMARY OF THE INVENTION

The present invention comprises a front equipment mount for attaching a piece of equipment to a front end of a wheeled vehicle having an independent front suspension. The mount includes a longitudinal frame having forward and rearward ends wherein the forward end is positionable proximate the front end of the vehicle and the rearward end is attachable to the vehicle rearward of the front suspension. A transverse frame member connected to the longitudinal frame has opposed left and right ends. The left end is connectable to a left suspension member of the vehicle and the right end is connectable to a right suspension member of the vehicle. The piece of equipment is attachable to the forward end of the longitudinal frame such that the weight of the piece of equipment is supported by the suspension members as unsprung weight. The longitudinal frame member is preferably a flexible member, such as a leaf spring, so that the independent front suspension will remain functional with the mount installed.

DETAILED DESCRIPTION OF THE PREFERRED EMBODIMENT

Figure 1:
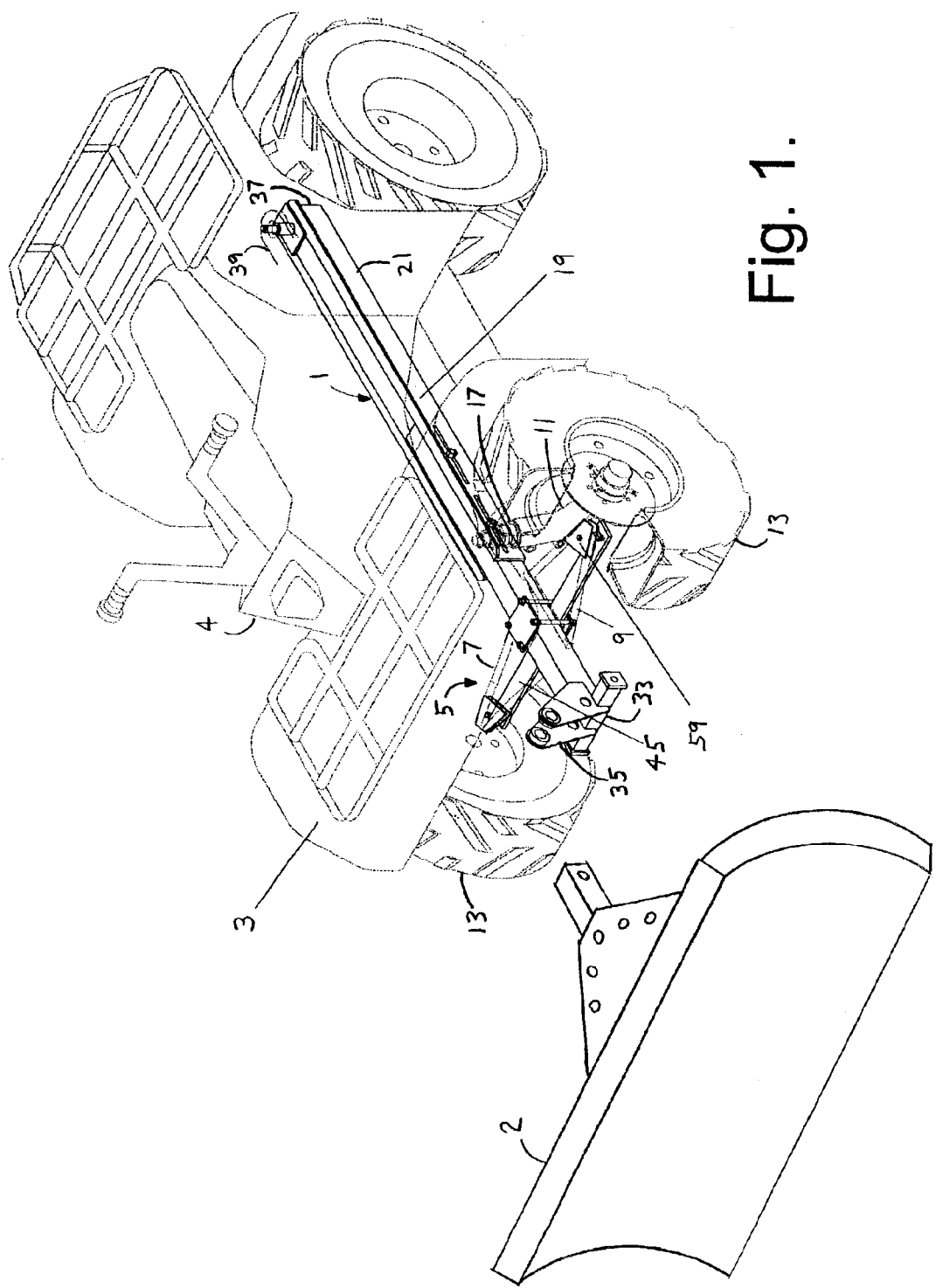
FIG. 1 is a perspective view of an equipment mount according to the present invention showing the mount installed on a wheeled vehicle.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, and in particular to FIG. 1, the reference number 1 generally designates a front equipment mount according to the present invention. The mount 1 is used to attach a piece of front mounted equipment 2 to a wheeled vehicle 3. The equipment 2 will be depicted herein as a snowplow, however it is to be understood that the mount 1 is also suited for use with other types of equipment 2 including but not limited to bucket loaders, forklifts and other similar equipment. Similarly, the vehicle 3 will be depicted herein as an all terrain vehicle (ATV), however it is to be understood that the present invention is adaptable to other types of wheeled vehicles 3 including, but not limited to, light trucks (such as pickup trucks) and sport utility vehicles.

The mount 1 is especially well suited for use on vehicles 3 having a chassis 4 with an independent front suspension system 5 including a right A-arm or similar right suspension member 7 and a left A-arm or similar left suspension member or A-arm 9. The suspension members 7 and 9 are each pivotally attached to the chassis 4 for movement about a respective generally longitudinal axis. Each of the suspension members 7 and 9 is further connected to a respective wheel carrier 11 (such as a steering knuckle or strut housing) by a respective ball joint (not shown). A respective front wheel 13 is rotatably connected to each wheel carrier 11. Interposed between each suspension member 7 and 9 and the chassis 4 is a front spring 17.

Figure 2:
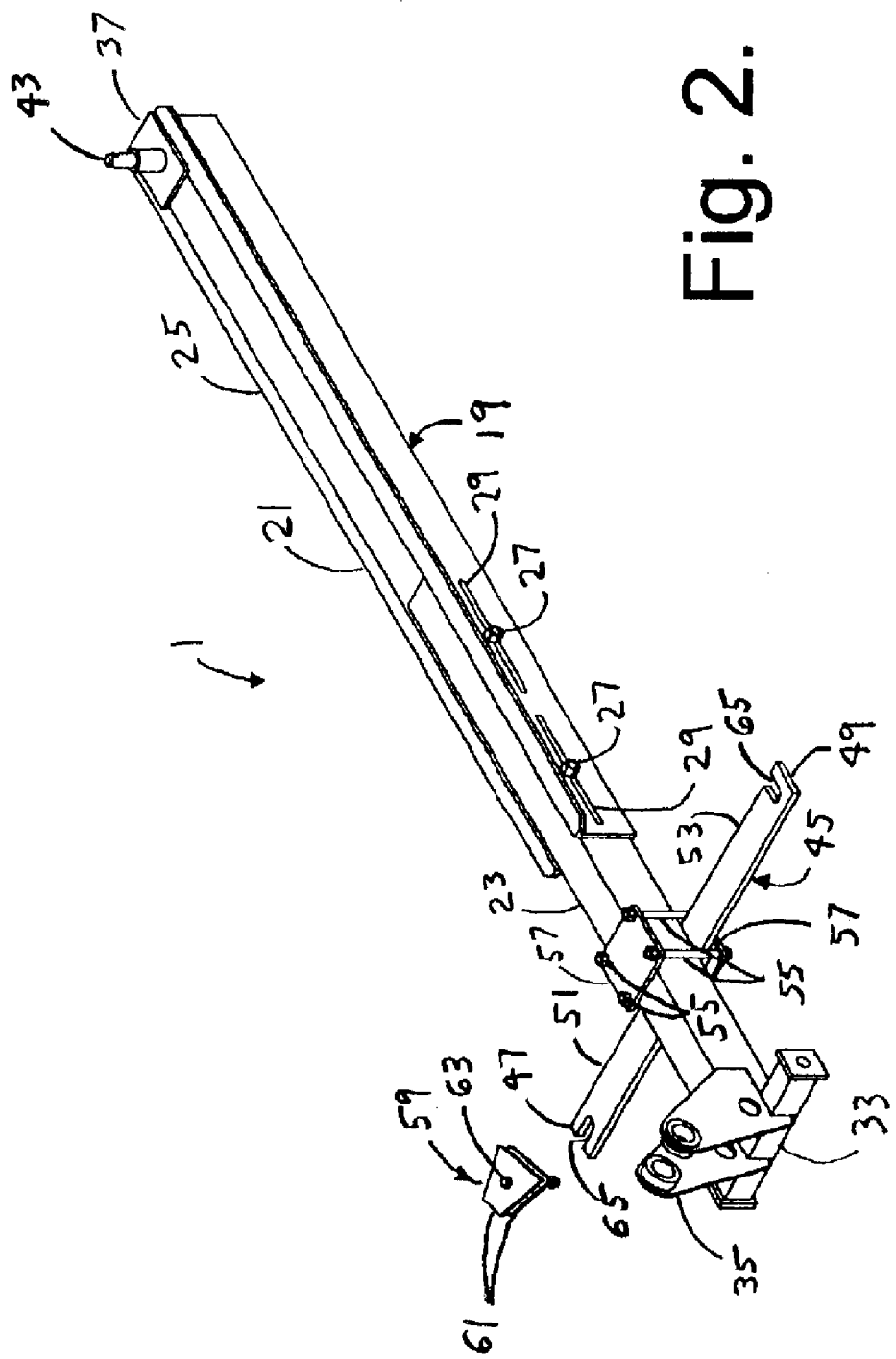
FIG. 2 is a perspective view of the equipment mount of FIG. 1.
Figure 3:
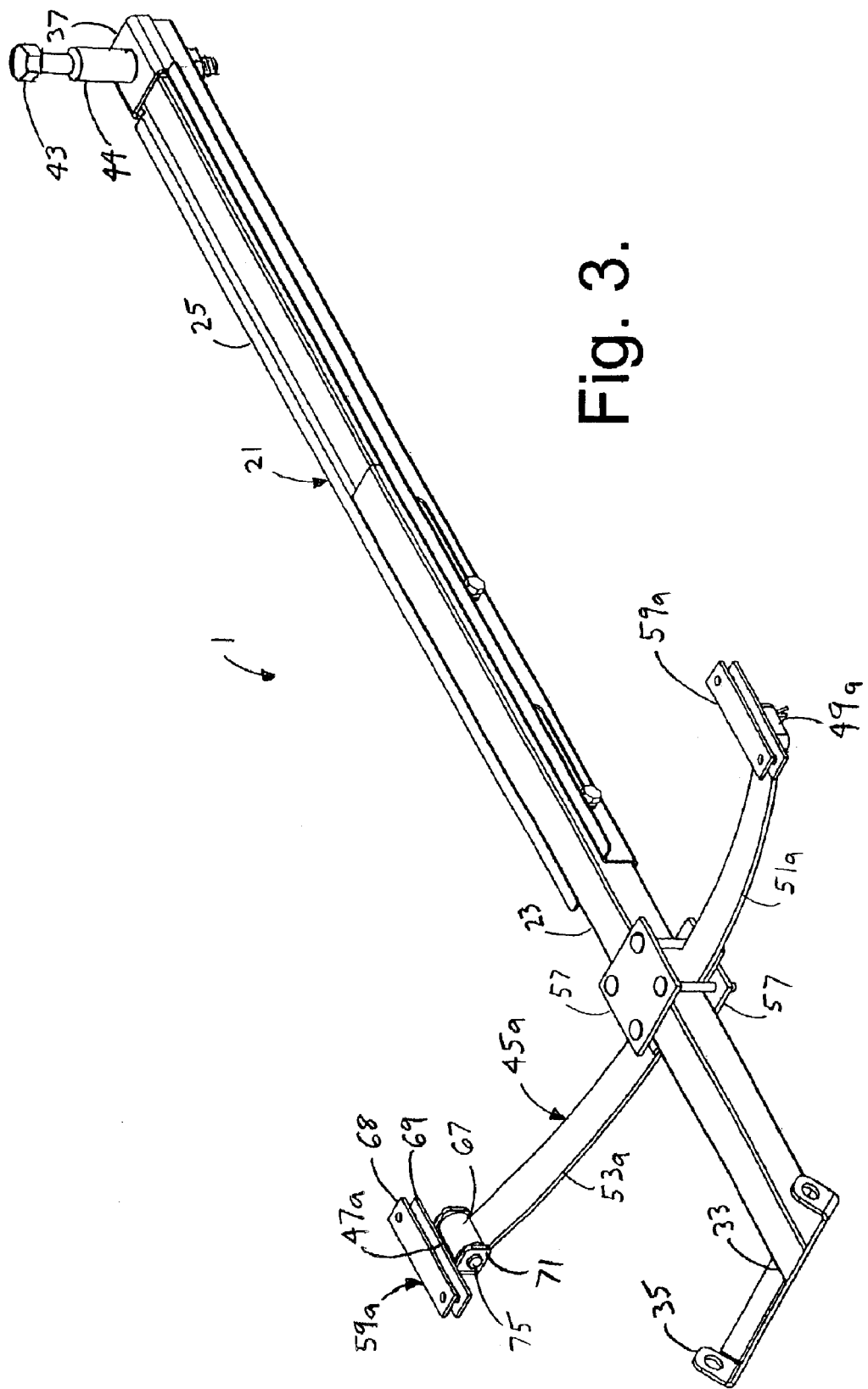
FIG. 3 is a perspective view of a second embodiment of the equipment mount.

Referring to FIG. 2, the mount 1 includes a longitudinal frame 19 which, in ATV applications, comprises a single longitudinal frame member or backbone 21. In truck or SUV applications wherein the vehicle includes a depending transmission or drivetrain along the longitudinal centerline of the vehicle, the longitudinal frame 19 could include a pair of such longitudinal frame members 21 (not shown) wherein one of the members 21 is positioned on each side of the drivetrain.

Figure 4:
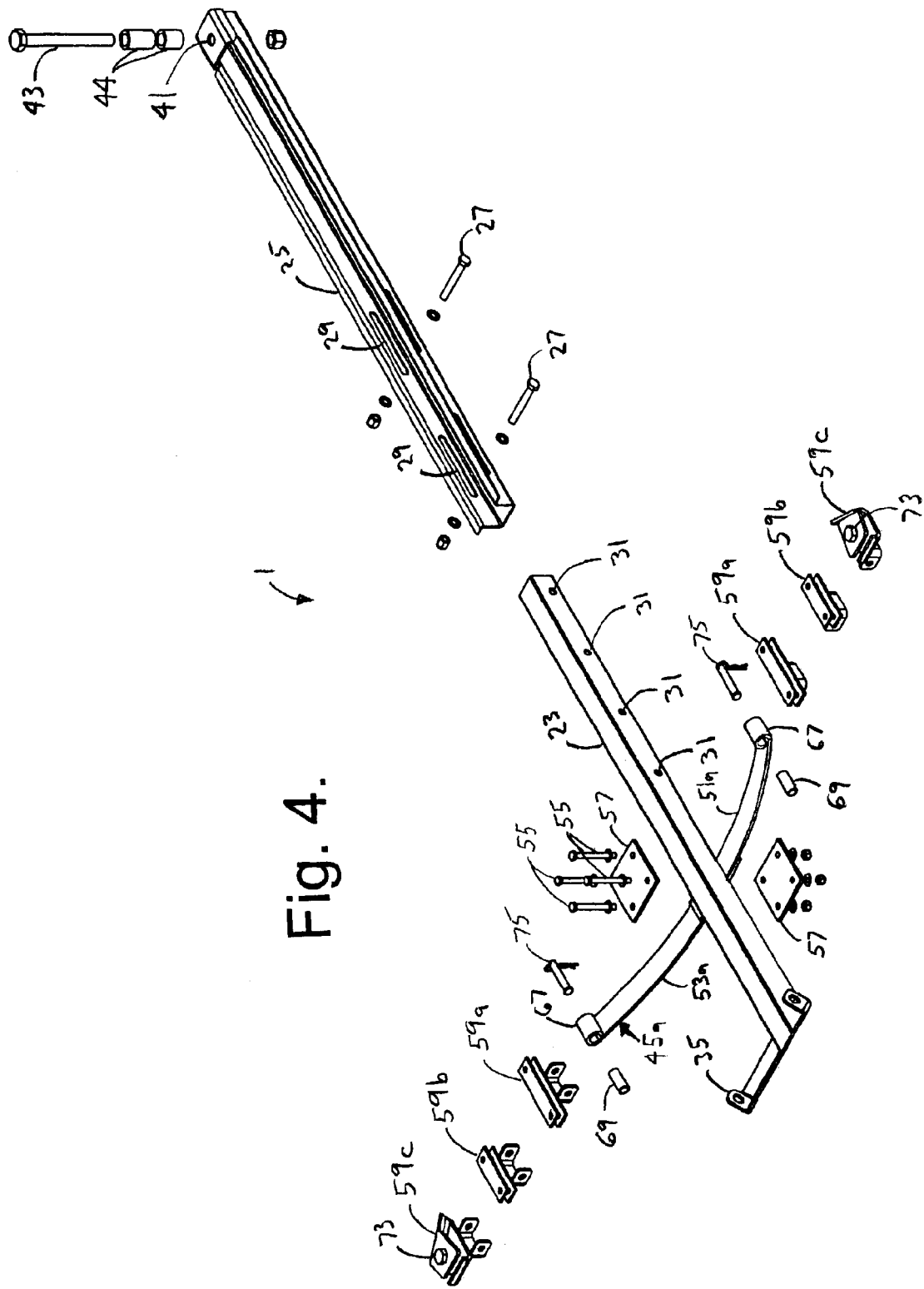
FIG. 4 is an exploded perspective view of the equipment mount of FIG. 3.
Figure 5:
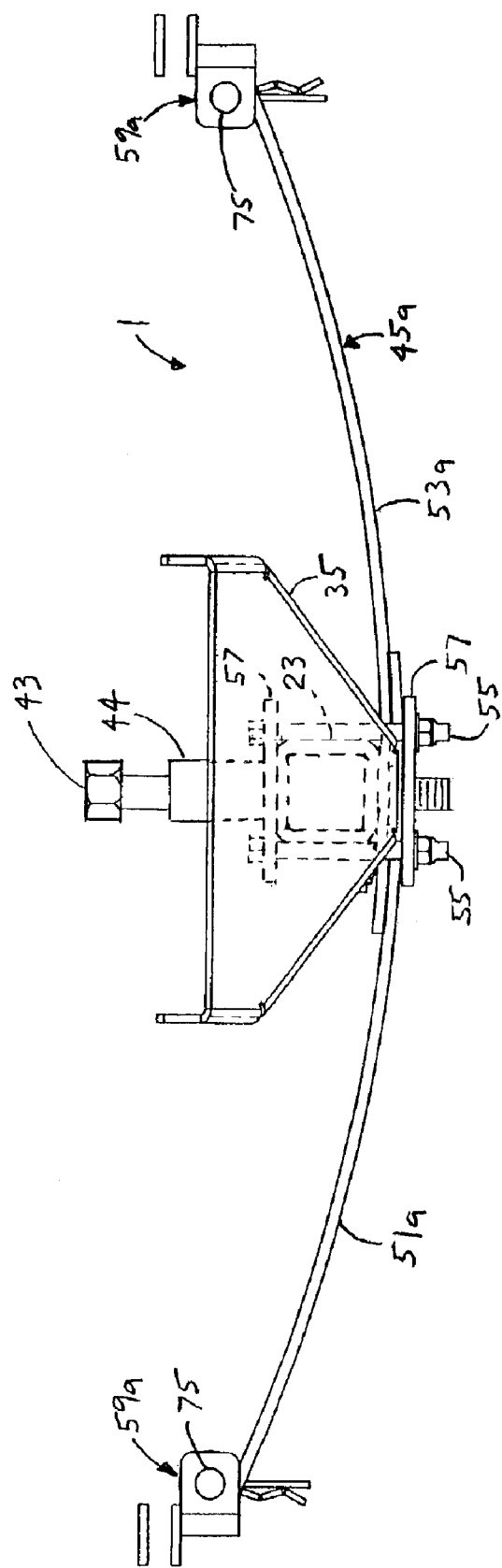
FIG. 5 is a front view of the equipment mount of FIG. 3.
Figure 6:
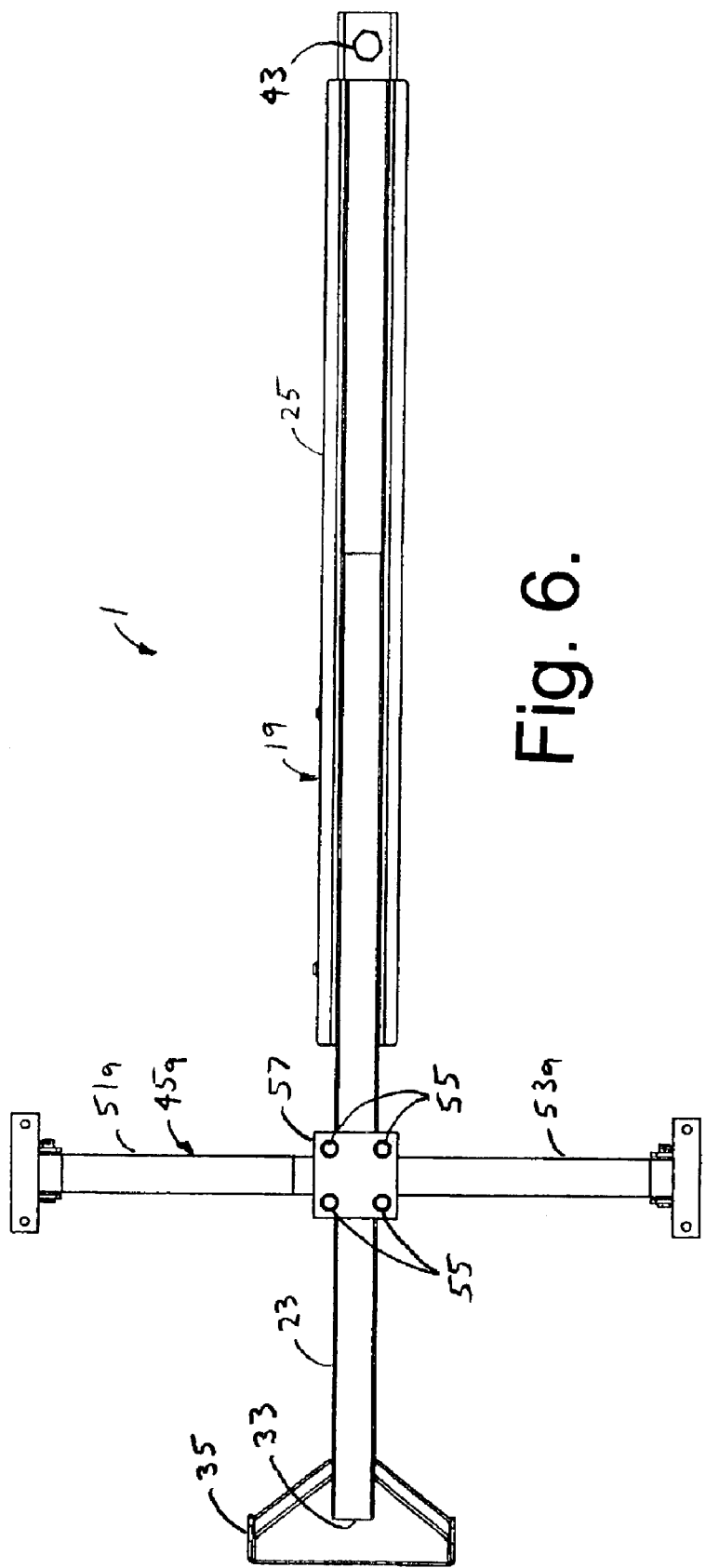
FIG. 6 is a top view of the equipment mount of FIG. 3.
Figure 7:
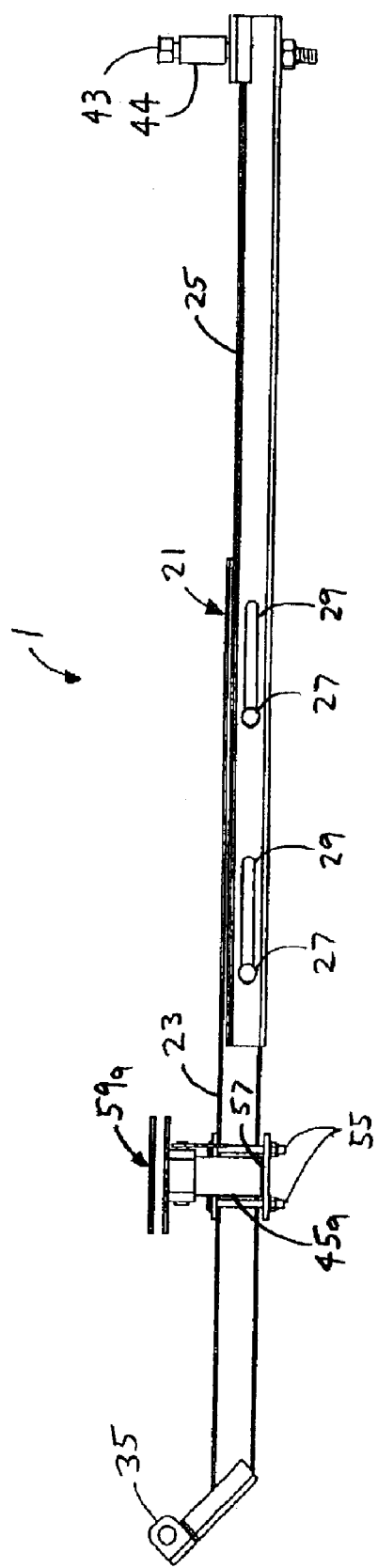
FIG. 7 is a side view of the equipment mount of FIG. 3.

The longitudinal frame member 21 is preferably adjustable in length so as to be adaptable to fit vehicles 3 of varying wheelbase, and may comprise a front section 23 telescopically coupled to a rear section 25. For example, the rear section 25 can comprise a generally U-shaped channel and the front section 23 can comprise a section of square tubing sized to be received within the channel of the rear section 25. The front section 23 is secured to the rear section 25 by bolts 27 which are received through elongated slots 29 in the rear section 25 and selected ones of a set of longitudinally spaced holes 31 (see FIG. 4) in the front section 23.

The front section 23 includes a forward end 33 to which is attached a bracket 35, which is generally in the form of a clevis, for connecting the piece of equipment 2 to the mount. The rear section 25 has a back end 37 which is attachable to the vehicle 3 rearward of the front wheels 13. If the vehicle 3 is equipped with a trailer hitch 39, the hitch 39 can provide a convenient and effective attachment point for the back end 37 of the rear section 25. In order to facilitate connection of the rear section 25 to the hitch 35, the rear section 25 is provided with a vertical pin receiver 41 (see FIG. 4) proximate the back end 37. The pin receiver 41 is sized to accept a pin or bolt 43 which is simultaneously inserted through the hitch 35 and pin receiver 41 to connect the rear section 25 to the vehicle 3. One or more tubular spacers 44 may be used on the bolt 43 to space the longitudinal frame member 21 downwardly from the hitch 35.

The mount 1 further includes a transverse frame member 45 which is secured to the longitudinal frame 19. The transverse frame member 45 is positioned along the length of the longitudinal frame 19 to place it in alignment with the suspension members 7 and 9 of the vehicle 3. The transverse frame member 45 has opposed right and left ends 47 and 49, respectively. The right end 47 of the transverse frame member 45 is securable to the right suspension member 7 of the vehicle 3. The left end 49 of the transverse frame member 45 is securable to the left suspension member 9 of the vehicle 3.

It is to be understood that the transverse frame member 45 may be of a one piece construction, however, in order to allow the length the transverse frame member 45 to be adjusted to fit various vehicles 3, the transverse frame member 45 preferably comprises a right portion 51 and a left portion 53 which are mounted so as to be mutually extensible. For example, the transverse frame member 45 may be connected to the longitudinal frame member 21 by four bolts 55 extending through aligned openings in a pair of plates 57 between which the longitudinal frame member 21 and both portions 51 and 53 of the transverse frame member 45 are sandwiched. With the bolts 55 loosened, the right and left portions 51 and 53 of the transverse frame member 45 may be moved relative to one another such that the right and left ends 47 and 49 may be moved inwardly or outwardly. When the bolts 55 are tightened, the right and left portions 51 and 53 are retained in a stationary position relative to the longitudinal frame member 21.

The ends 47 and 49 of the transverse frame member 45 may each be attached to the respective suspension member 7 or 9 by a mounting bracket assembly 59. Each assembly 59 includes a pair of plates 61 and an attaching bolt 63. Each of the plates 61 in each assembly 59 has a receiver extending therethrough for receiving the respective bolt 63. A notch, hole or receiver 65 is also formed in the transverse frame member 45 near each of the ends 47 and 49. The transverse frame member 45 is connected beneath the suspension members 7 and 9 by sandwiching each suspension member between a pair of the plates 61 and inserting a bolt 63 through the receivers in the plates 61 and the respective receiver 65 in the transverse frame member 45. The bolt 63 is then tightened to clamp the respective suspension member 7 or 9 between the plates 61.

Alternatively, on some vehicles 3 it may be possible to attach the transverse frame member 45 to the suspension members 7 and 9 by connecting the ends 47 and 49 directly to the respective ball joints (not shown). For example, nuts (not shown) securing the ball joints to their respective suspension members 7 and 9 may be removed from their respective ball joint retaining studs (not shown), the receivers 65 in the transverse frame member 45 slid over the retaining studs, and the nuts reinstalled.

With the mount 1 installed on the vehicle 3, the weight of a piece of equipment 2 connected to the bracket 35 is supported as unsprung weight on the suspension members 7 and 9. The front springs 17, therefore, do not have to carry the weight of the equipment 2 and are not subject so sag or bottom out. An upward force is exerted on the vehicle 3 at the point where the back end 37 of the longitudinal frame 19 is connected to the vehicle 3, however this force is minimized by attaching the back end 37 as far rearwardly as possible to provide the longest lever arm and thereby the smallest upward force on the vehicle 3.

It should be noted that, if the transverse frame member 45 is substantially rigid, the installation of the mount 1 on the vehicle 3 would essentially override the independent front suspension system 5 by locking the suspension members 7 and 9 together. This would produce a harsh ride and make the vehicle difficult to maneuver on rough terrain. While these consequences might be acceptable under certain circumstances, it is advantageous to retain as much independent movement between the suspension members 7 and 9 as possible. This can be accomplished by using a material for the transverse frame member 45 which is at least somewhat flexible, such as a flat or leaf spring.

Figure 8:
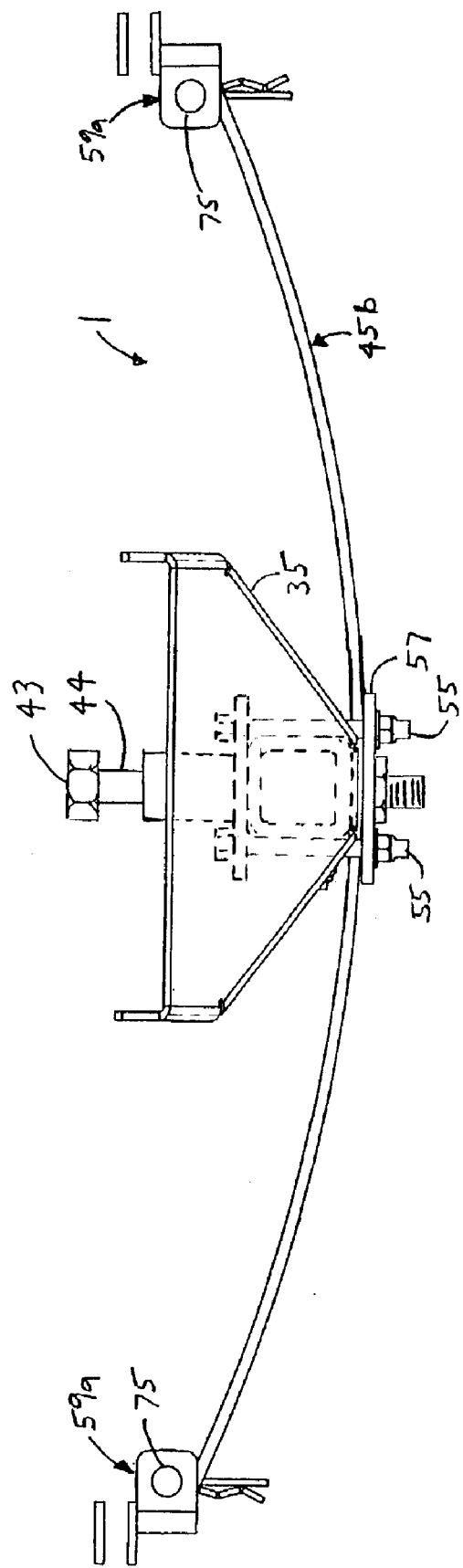
FIG. 8 is a front view of a third embodiment of the equipment mount.

For example, FIGS. 3–7 show a second embodiment of the mount 1 wherein the transverse frame member comprises a semi-elliptic leaf spring 45a. As described above, the spring 45a includes a right end 47a, a left end 49a, and preferably comprises right and left portions 51a and 53a, respectively, which are selectively extensible relative to one another. A third embodiment of the mount 1, shown in FIG. 8, has a transverse frame member comprising a one piece leaf spring 45b, which also has opposed right and left ends 47a and 49a, respectively.

Each of the ends 47a and 49a includes an eyelet 67 which receives a bushing 69. The eyelets 67 are connectable to the suspension members 7 and 9 by respective mounting bracket assemblies, such as bracket assemblies 59a, 59b or 59c. Each bracket assembly 59a, 59b or 59c comprises an upper plate 68, a lower plate 69, a spring shackle 71 connected to the lower plate 69, and at least one attaching bolt 73. The transverse frame member 45a or 45b is connected beneath the suspension members 7 and 9 by sandwiching each suspension member between an upper plate 68 and a lower plate 69 and then installing one or more bolts 73 through receivers in the plates 68 and 69 so as to draw the plates 68 and 69 together. A respective pin 75 is then inserted through each spring shackle 71 and a respective eyelet 67 of the transverse member 45a or 45b. The assemblies 59a, 59b, and 59c generally differ from one another in the size and shape of the respective plates 68 and 69, which can be selected to correspond to different vehicles 3 or to different lateral mounting positions on the respective suspension members 7 and 9.

It is to be understood that while certain forms of the present invention have been illustrated and described herein, it is not to be limited to the specific forms or arrangement of parts described and shown.

What is claimed and desired to be secured by Letters Patent is as follows:

1. A front equipment mount for attaching a piece of equipment to a front end of a wheeled vehicle having a chassis and an independent front suspension with left and right suspension members pivotally attached to the chassis, said mount comprising:
    a) a longitudinal frame having forward and rearward ends; said forward end being positionable proximate the front end of the vehicle and said rearward end being attachable to the vehicle rearward of the front suspension; and
    b) a transverse frame member connected to said longitudinal frame and having opposed left and right ends, said left end being connectable to the left suspension member of the vehicle said right end being connectable to the right suspension member of the vehicle; wherein
    c) the piece of equipment is attachable to said forward end of said longitudinal frame such that the weight of the piece of equipment is supported by the left and right suspension members as unsprung weight.

2. The front equipment mount as in claim 1 wherein said transverse frame member includes a left section and a right section which are selectively extendable relative to one another.

3. The front equipment mount as in claim 1 wherein each of said left and right ends of said transverse frame member is connectable to the respective suspension member by a respective bracket assembly.

4. The front equipment mount as in claim 3 wherein each of said bracket assemblies comprises a pair of plates and a threaded fastener interconnecting said pair of plates, said plates being adapted to sandwich the respective suspension member therebetween such that tightening said threaded fastener causes said plates to clamp down on the respective suspension member, said threaded fastener further being connectable to the transverse frame member.

5. The front equipment mount as in claim 1 wherein said transverse frame member is vertically flexible.

6. The front equipment mount as in claim 5 wherein said transverse frame member is a leaf spring.

7. The front equipment mount as in claim 6 wherein said leaf spring is semi-elliptic.

8. The front equipment mount as in claim 7 wherein said leaf spring has an eyelet formed at each of said left and right ends.

9. The front equipment mount as in claim 8 wherein each of said left and right ends of said leaf spring is connectable to the respective suspension member by a respective bracket assembly.

10. The front equipment mount as in claim 9 wherein each of said bracket assemblies comprises an upper plate, a lower plate and a threaded fastener interconnecting said upper and lower plates, said plates being adapted to sandwich the respective suspension member therebetween such that tightening said threaded fastener causes said plates to clamp down on the respective suspension member, said lower plate having a spring shackle connected thereto and sized to receive the one of said eyelets on the respective right or left end of said leaf spring.

11. The front equipment mount as in claim 1 wherein said longitudinal frame comprises a longitudinal frame member having front and rear sections telescopically extendable relative to one another.

12. The front equipment mount as in claim 1 wherein said rearward end of said longitudinal frame is attachable to a trailer hitch of the vehicle.

13. A front equipment mount for attaching a piece of equipment to a front end of a wheeled vehicle having a chassis and an independent front suspension with left and right suspension members pivotally attached to the chassis, said mount comprising:
    a) a longitudinal frame having forward and rearward ends; said forward end being positionable proximate the front end of the vehicle and said rearward end being attachable to the vehicle rearward of the front suspension; and
    b) a transverse leaf spring connected to said longitudinal frame and having opposed left and right ends, said left end being connectable to the left suspension member of the vehicle said right end being connectable to the right suspension member of the vehicle; wherein
    c) the piece of equipment is attachable to said forward end of said longitudinal frame member such that the weight of the piece of equipment is supported by the left and right suspension members as unsprung weight.

14. The front equipment mount as in claim 13 wherein said leaf spring includes a left section and a right section which are selectively extensible relative to one another.

15. The front equipment mount as in claim 13 wherein said leaf spring is semi-elliptic.

16. The front equipment mount as in claim 13 wherein said leaf spring has an eyelet formed at each of said left and right ends.

17. The front equipment mount as in claim 16 wherein each of said left and right ends of said leaf spring is connectable to the respective suspension member by a respective bracket assembly.

18. The front equipment mount as in claim 17 wherein each of said bracket assemblies comprises an upper plate, a lower plate and a threaded fastener interconnecting said upper and lower plates, said plates being adapted to sandwich the respective suspension member therebetween such that tightening said threaded fastener causes said plates to clamp down on the respective suspension member, said lower plate having a spring shackle connected thereto and sized to receive the one of said eyelets on the respective right or left end of said leaf spring.

19. A front equipment mount for attaching a piece of equipment to a front end of a wheeled vehicle having a chassis and an independent front suspension with left and right suspension members pivotally attached to the chassis, said mount comprising:

a) a longitudinal frame member having forward and rearward ends; said forward end being positionable proximate the front end of the vehicle and said rearward end being attachable to the vehicle rearward of the front suspension; and b) a transverse frame member connected to said longitudinal frame member and having opposed left and right ends, said left end being connectable to the left suspension member of the vehicle said right end being connectable to the right suspension member of the vehicle, said transverse frame member including left and right sections selectively extendable relative to one another; wherein c) the piece of equipment is attachable to said forward end of said longitudinal frame member such that the weight of the piece of equipment is supported by the left and right suspension members as unsprung weight.

20. The front equipment mount as in claim 19 wherein said longitudinal frame member comprises front and rear sections telescopically extendable relative to one another.

* * * * *